(12) United States Patent
Palmer et al.

(10) Patent No.: US 12,350,641 B2
(45) Date of Patent: Jul. 8, 2025

(54) METHODS OF HIGH THROUGHPUT HYDROCOLLOID BEAD PRODUCTION AND APPARATUSES THEREOF

(71) Applicant: ClearH2O, Inc., Westbrook, ME (US)

(72) Inventors: Jay Palmer, Brunswick, ME (US); Paul Dioli, Yarmouth, ME (US)

(73) Assignee: ClearH2O, Inc., Westbrooke, ME (US)

( * ) Notice: Subject to any disclaimer, the term of this patent is extended or adjusted under 35 U.S.C. 154(b) by 275 days.

(21) Appl. No.: 18/118,394

(22) Filed: Mar. 7, 2023

(65) Prior Publication Data

US 2023/0249146 A1   Aug. 10, 2023

Related U.S. Application Data

(63) Continuation-in-part of application No. 17/377,876, filed on Jul. 16, 2021, now Pat. No. 11,596,913.

(51) Int. Cl.
| | |
|---|---|
| *B29C 64/00* | (2017.01) |
| *B01J 2/08* | (2006.01) |
| *B01J 13/00* | (2006.01) |
| *B01J 19/00* | (2006.01) |
| *B01J 19/28* | (2006.01) |

(52) U.S. Cl.
CPC ............ *B01J 2/08* (2013.01); *B01J 13/0069* (2013.01); *B01J 19/0053* (2013.01); *B01J 19/285* (2013.01)

(58) Field of Classification Search
CPC ................ B01J 2/08; B01J 13/0069
See application file for complete search history.

(56) References Cited

U.S. PATENT DOCUMENTS

| | | | |
|---|---|---|---|
| 3,272,893 A | 9/1966 | Mogensen | |
| 4,690,788 A * | 9/1987 | Yada | B29B 13/065 |
| | | | 264/494 |
| 5,211,980 A | 5/1993 | Cox | |
| 5,589,150 A * | 12/1996 | Kano | B01J 37/0045 |
| | | | 423/338 |
| 5,766,907 A | 6/1998 | Chang et al. | |
| 6,238,690 B1 | 5/2001 | Kiefer et al. | |
| 9,884,025 B2 * | 2/2018 | Maio | C12N 11/082 |
| 2005/0238746 A1 | 10/2005 | Crather et al. | |
| 2007/0082045 A1 | 4/2007 | Yamanaka et al. | |
| 2007/0205157 A1 * | 9/2007 | Jones | C02F 1/004 |
| | | | 210/688 |

(Continued)

FOREIGN PATENT DOCUMENTS

WO   WO-2019204245 A1 * 10/2019 ........... A23K 20/105

OTHER PUBLICATIONS

Leong et al., "Advances in fabricating spherical alginate hydrogels with controlled particle designs by ionotropic gelation as encapsulation systems", Elsevier, Particuology, ScienceDirect, 2016, vol. 24, pp. 44-60, 17 pages.

*Primary Examiner* — Nicholas R Krasnow
(74) *Attorney, Agent, or Firm* — Hayes Soloway P.C.

(57) ABSTRACT

A method of creating hydrocolloid beads includes forcing a hydrocolloid gel suspension through a plurality of nozzles, wherefrom the hydrocolloid gel forms into a plurality of gel drops and fall into a reactant bath. The drops are exposed to the reactant bath for a predetermined period of time, wherein the drops form firm or semi-firm beads as they remain in the reactant bath. The firm or semi-firm beads are removed from the reactant bath, rinsed, and dried.

14 Claims, 9 Drawing Sheets

(56) References Cited

U.S. PATENT DOCUMENTS

| | | |
|---|---|---|
| 2010/0126923 A1* | 5/2010 | Park .................... A61M 1/3489 |
| | | 210/202 |
| 2010/0209525 A1 | 8/2010 | Bohmer et al. |
| 2013/0209389 A1* | 8/2013 | Tofte Jespersen ... B01J 13/0069 |
| | | 424/78.09 |
| 2014/0017304 A1 | 1/2014 | Bosmans et al. |
| 2014/0193566 A1* | 7/2014 | Haefeli .................. A23C 19/06 |
| | | 426/582 |
| 2015/0197610 A1* | 7/2015 | Peterson ............ C08G 18/4804 |
| | | 521/76 |
| 2016/0143943 A1* | 5/2016 | Ohno .................. C08B 37/0072 |
| | | 424/493 |
| 2017/0209250 A1 | 7/2017 | Palmer et al. |
| 2019/0284349 A1 | 9/2019 | Bassett et al. |
| 2021/0138106 A1 | 5/2021 | Hutchins et al. |
| 2022/0062791 A1* | 3/2022 | Wang ..................... C12M 29/04 |
| 2023/0404130 A1* | 12/2023 | Becker .................. A61K 8/733 |

\* cited by examiner

METHODS OF HIGH THROUGHPUT HYDROCOLLOID BEAD PRODUCTION AND APPARATUSES THEREOF

CROSS-REFERENCE TO RELATED APPLICATIONS AND PRIORITY

This patent application is a Continuation-in-Part of U.S. patent application Ser. No. 17/377,876 filed Jul. 16, 2021 (issued as U.S. Pat. No. 11,596,913 on Mar. 7, 2023). This patent application is herein incorporated by reference in its entirety.

FIELD OF THE DISCLOSURE

The disclosure relates to methods for creating hydrocolloid beads, particularly at a high rate of production, and apparatuses for performing such methods.

BACKGROUND

Hydrocolloids are a heterogeneous group of long chain polymers that are known to form viscous dispersions and/or gels when dispersed in water. They contain a large number of hydroxyl (—OH) groups, which increases their ability to bind with water molecules, thus rendering them hydrophilic compounds. Additionally, they produce a dispersion that exhibits the properties of a colloid.

SUMMARY

Hydrocolloids are commonly used in food products due to their viscosity and texture, i.e., they are good thickening and/or gelling agents that are beneficial to a wide range of food products from soups to ice creams. Hydrocolloids that are known to be good gelling agents include: modified starch, k-carrageenan and i-carrageenan, pectin, gellan gum, alginate and cellulose.

In some instances, various combinations of hydrocolloids and reactant solutions are known to form hydrogel beads. For example, alginate hydrogel beads have been explored as a texture additive and as a delivery vehicle. However, creating a hydrogel bead that maintains its form has proven difficult. For example, previous types of hydrogel beads experience syneresis, which is the undesirable expulsion of water from the bead. Additionally, producing useful beads in mass quantities is also a challenge. What is needed, therefore, is a method of efficiently creating firm and stable hydrocolloid beads in large quantities.

Previously known hydrogel beads contain mostly water, along with some corn syrup, sodium alginate, and preservative. However, these conventional hydrogel beads lack robust nutritional content. Also, conventional hydrogels that contain more nutrients tended to be irregularly-shaped and difficult to dispense to animals or produce using efficient manufacturing processes. Extruded high moisture diets and nutrition supplements can sometimes contain more nutrients but can't accommodate sufficient water to provide ideal hydration to the animal. In contrast with previously known techniques, the presently disclosed devices and methods are capable of producing nutrient-rich beads that are also high in water content to provide sufficient hydration to animals. For example, in some embodiments, the presently disclosed beads can contain approximately 5% protein, along with fiber, carbohydrates, and water, while also having a substantially uniform size and shape.

High throughput processes of hydrocolloid bead production that are able to generate millions of hydrocolloid beads per minute are disclosed herein. The hydrocolloid beads may then be used for a variety of purposes, such as a top dressing for poultry, starter supplemental hydration for poultry, vaccinations, and/or probiotic or nutrient delivery systems for poultry. The beads may also be used in the creation of human food products, such as flavor inclusion beads for ice cream toppings, imitation caviar and specialty food flavor beads for jams and jellies. Additionally, the beads may be used to supply hydration and nutrients to other animals, such as rodents, swine, cattle and horses as, for example, hydration and/or nutritive support, or as a flavor attractant, in some embodiments.

The disclosed processes take a hydrocolloid gel suspension, typically comprising water and up to 10% hydrocolloid and introduce the gel suspension into a reactant bath to create soft to firm beads. The resulting beads typically measure between 1 millimeter ("mm") and 5 mm in size. The centipoise of the gel suspension can range from 0-5,000 centipoise. This process may be performed with either a old or hot gel suspension, and the reactant bath may be comprised of only distilled water or a combination of water with various ions present, such as potassium ions (K+), calcium ions (Ca2+) and/or magnesium ions (Mg2+). The bath may also contain a preservative, such as potassium sorbate.

The disclosed processes can accomplish several goals simultaneously. For example, in addition to catalyzing the crosslinking process involved in forming the beads, the process can also, in some embodiments, pasteurize the beads. In some such embodiments, a heated reactant bath may be used. For example, in select embodiments, the reactant bath may be heated to 250° F. or higher to catalyze the crosslinking process for bead formulation. In these and other embodiments, the beads may be pasteurized at a temperature of 250 OF or higher after exiting the reactant bath. Numerous configurations and variations of the bead formation process and either concurrent or subsequent pasteurization are possible and contemplated herein.

An apparatus is provided to pump the gel solution through a plurality of manifolds that dispense the gel through a plurality of nozzles and into the reactant bath. The gel drops begin to form firm or semi-firm beads when they enter the bath and harden over time while exposed to the bath. The bath may be provided in an inclined tray or conveyor type of system such that the beads run downstream in the bath, exiting the bath after a pre-determined amount of time that is calculated to create the desired level of bead firmness. The time may range from a few seconds to a few minutes, depending on how firm the beads should be. As the beads exit the bath they fall onto or into a machine that shakes the excess reactant off the beads, after which the beads are rinsed with water or with a water salt solution (optionally containing preservative) and packaged for storage and/or delivery. If desired, the excess reactant can be recycled back through the apparatus to help form new beads. The beads may be packed into a container with or without a brine solution. The brine solution serves to preserve and stabilize (prevent syneresis) the bead. The brine solution may contain preservatives and stabilizers, such as ingredients with a divalent cation. In some situations, the beads may also be dried such that their moisture content is between 0% and 95%. The resulting dried beads may have a diameter of 0.100 mm to 5 mm, depending on moisture content. Additionally, the resulting beads may advantageously be resistant to or free from syneresis.

BRIEF DESCRIPTION OF THE DRAWINGS

The present disclosure makes reference to the accompanying drawings. In the drawings, like reference numbers indicate identical or functionally similar elements. The drawings are not necessarily drawn to scale.

DETAILED DESCRIPTION

Figure 1:
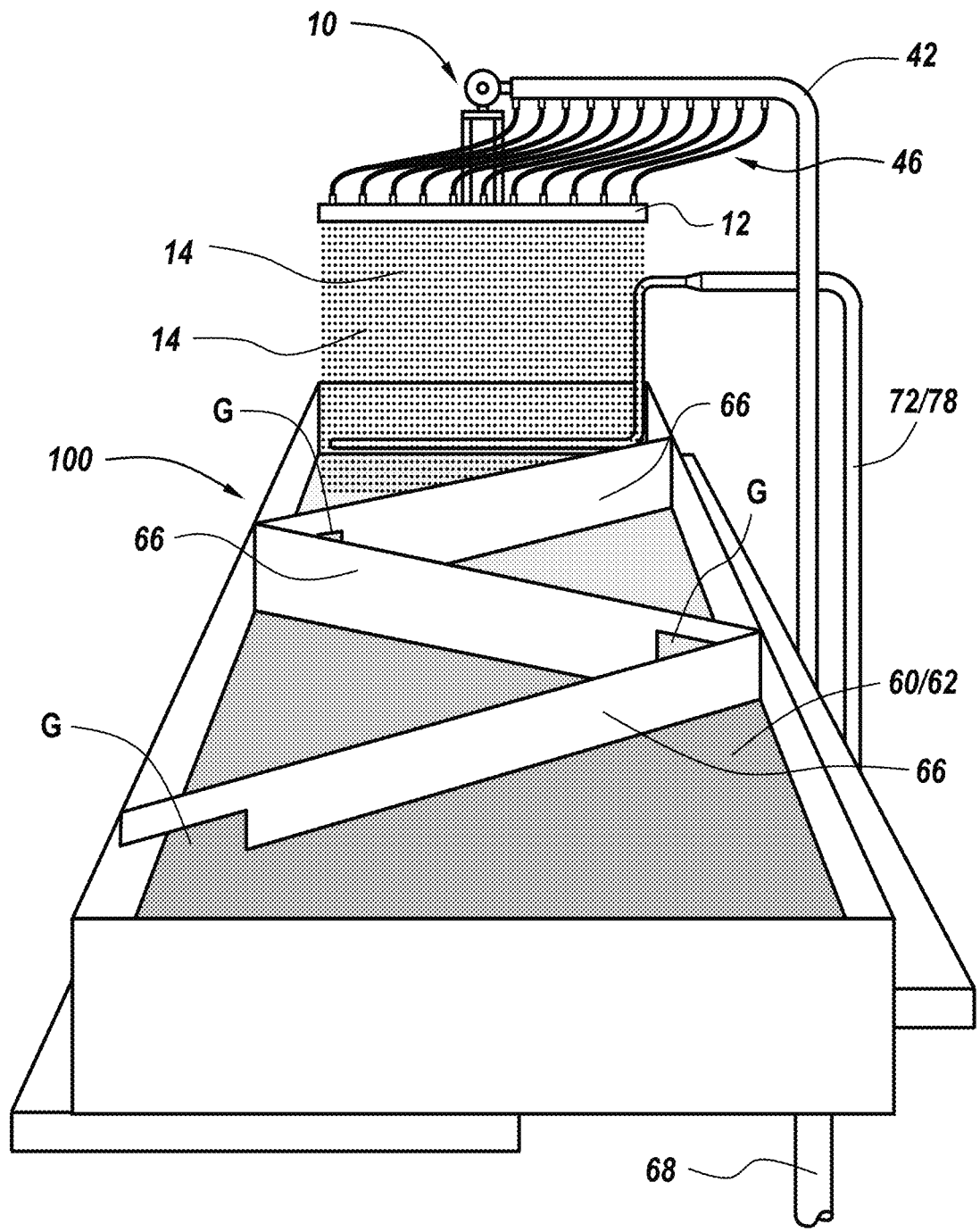
FIG. 1 is a front perspective view of an exemplary apparatus according to some embodiments of the present disclosure.

The presently disclosed devices and methods will now be described more fully in detail with reference to the accompanying drawings, in which some embodiments of the present disclosure are shown. This disclosure should not, however, be construed as limited to the embodiments set forth herein; rather, they are provided so that this disclosure will be complete and will fully convey the scope of the inventive subject matter to those skilled in the art.

High-throughput methods of creating hydrocolloid beads and devices for practicing the disclosed method will now be described. In use, the methods are capable of generating millions of firm or semi-firm hydrocolloid beads per minute. In some embodiments, the presently disclosed methods are capable of producing at least forty (40) pounds of beads every two (2) minutes.

In some embodiments, the presently disclosed methods use a dispensing apparatus to dispense drops of a hydrocolloid gel suspension into a reactant bath. In some embodiments, the hydrocolloid gel suspension is forced through a plurality of nozzles using a pressured line. As the gel suspension exits the nozzles, it forms drops by natural force (e.g., gravity) and/or mechanical force (e.g., shearing the gel suspension via nozzle vibration, a spinning disk, or a spinning wire). The drops them enter the reactant bath. Once the drops are in the bath, they are guided down an inclined tray, chute, or conveyor in the reactant bath for a predetermined amount of time, during which the drops of gel form into firm or semi-firm beads. The time the gel droplets are left in the bath may vary from a little as a few seconds to as long as five minutes, with the beads continuing to harden over as they dwell in the bath. When the beads reach the end of the conveyor they exit the bath and enter a drainage basin. Once the beads have exited the bath they are rinsed at least one time with water or with a water salt solution (optionally containing one or more preservatives) and then packed for storage and/or transportation. In some instances, depending on the intended use of the end user, the beads are packed into a brine solution or dried.

The hydrocolloid gel suspension may have a viscosity that ranges from 0-5,000 centipoise, in some embodiments. The hydrocolloid gel suspension may be heated or, alternatively, may be used as a cold gel suspension. The gel suspension may include a single hydrocolloid or a combination of hydrocolloids, such as sodium alginate, pectin, gellan gum, k-carrageenan, xanthan gum, and/or locus bean gum.

In embodiments in which a reactant bath is used to form the hydrocolloid beads and/or the hydrocolloid gel suspension, The process may be performed at ambient or heated temperatures. The heating process may, in some cases, partially or fully pasteurize the resulting hydrocolloid beads. Without wishing to be bound by theory, heating the hydrocolloid material(s) may result in at least partial pasteurization. In these and other embodiments, the hydrocolloid beads may be packed in a brine solution or optionally be pasteurized after formation, if desired. Numerous configurations and variations of hydrocolloid bead formation and either concurrent or subsequent stabilization are possible and contemplated herein.

The composition of the hydrocolloid gel suspension may vary based on the intended use of the end user. In some embodiments, the hydrocolloid gel suspension may be a relatively simple solution containing at least 90% by volume of water and up to 10% by volume hydrocolloid. In these and other embodiments, the gel suspension may also contain a humectant such as sorbitol, corn syrup, erythritol, glycerin, and/or other humectants. If present, humectants may occupy up to 30% of the total volume of the suspension. In certain situations, the gel suspension may contain up to 20% carbohydrates and/or 50% protein. In select embodiments, the gel suspension may include some combination of water, protein and carbohydrates in a ratio of, for example, 70%/20%/10% by volume, respectively. If present, the carbohydrates may be derived from corn syrup, sugar, high fructose corn syrup, sorbitol, erythritol, honey, molasses, and/or another carbohydrate source that is soluble in water. The protein source may be individual amino acids or complete protein sources such as fish protein, or other soluble proteins such as pea, soy, wheat, casein, and/or whey.

The reactant bath may consist of distilled water in some embodiments. However, in other embodiments, the reactant bath may include ions, such as K+, Ca2+, and/or Mg2+. In select embodiments, the reactant bath uses calcium chloride or calcium acetate as an ion source. The reactant bath may also contain a preservative, such as potassium sorbate, in some embodiments.

After the beads exit the bath, any remaining reactant may be removed from the beads by either shaking the beads and/or rinsing the beads. After reactant removal, the beads may be packaged with a brine solution, sprayed or otherwise exposed to a solution that may contain lecithin, preservatives, salts, and/or oils to coat the beads. The coated beads may be dried, in some embodiments, to achieve a desire moisture content ranging from 0% to 95%. There are a number of suitable methods for drying the coated beads, such as, for example, using a conventional conveyor dryer having a length of 5 feet to 20 feet. Conventional dryers have known ways to modify the extent of the drying to reach a desired moisture content.

The fully formed and ready to use beads can be between 0.100 mm and 5 mm in size and may contain up to 98% water. In some embodiments, the beads may have a moisture content of 70-95%. As noted, the beads may also contain up to 20% carbohydrates and 50% protein or some combination of water, protein and carbohydrates. In select embodiments, the beads contain 70% water, 20% protein, and 10% carbohydrates by volume.

FIGS. 1-8 illustrate an embodiment of a device 100 that can be used to practice the disclosed methods. The device 100 includes a delivery system 10, a reactant bath platform 60, and a rinse platform 80. The delivery system 10 dispenses gel drops into the bath platform 60, which is filled with a reactant solution, after which the gel drops form firm or semi-firm beads as they pass through the bath platform 60 and into the rinse platform 80.

Figure 2:
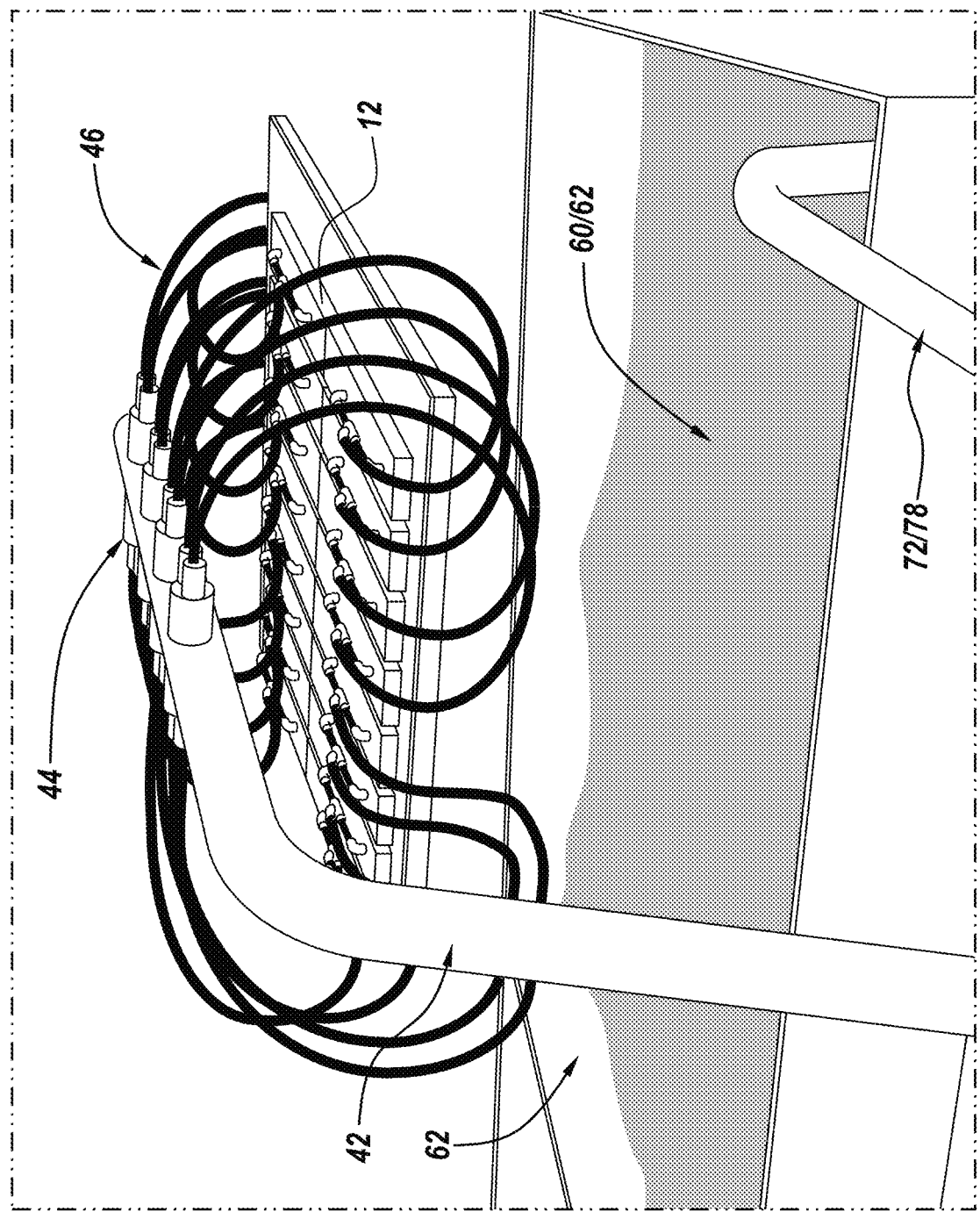
FIG. 2 is a front and top perspective view of a portion of the apparatus shown in FIG. 1.
Figure 3:
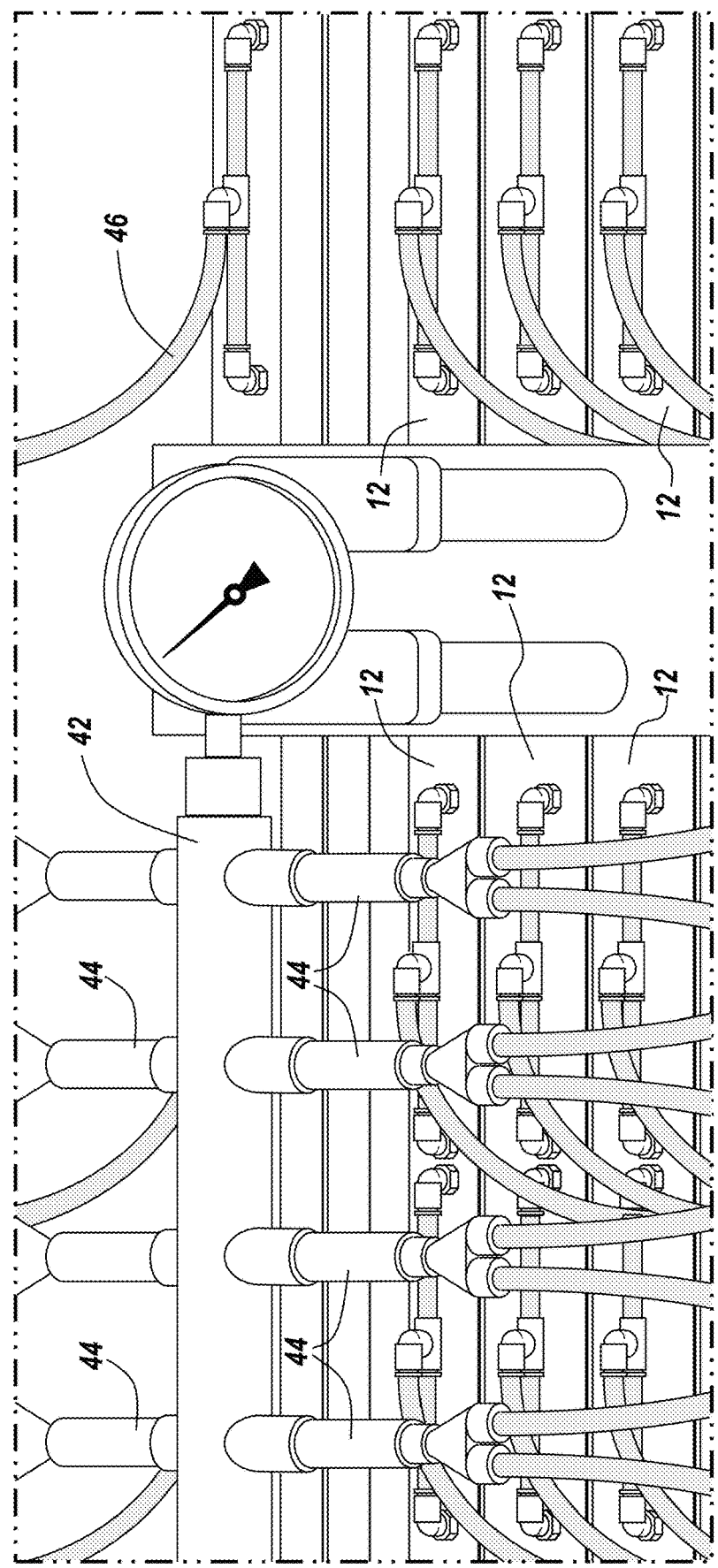
FIG. 3 is a side and top view showing the manifolds of the apparatus of FIG. 1 and FIG. 2.
Figure 4:
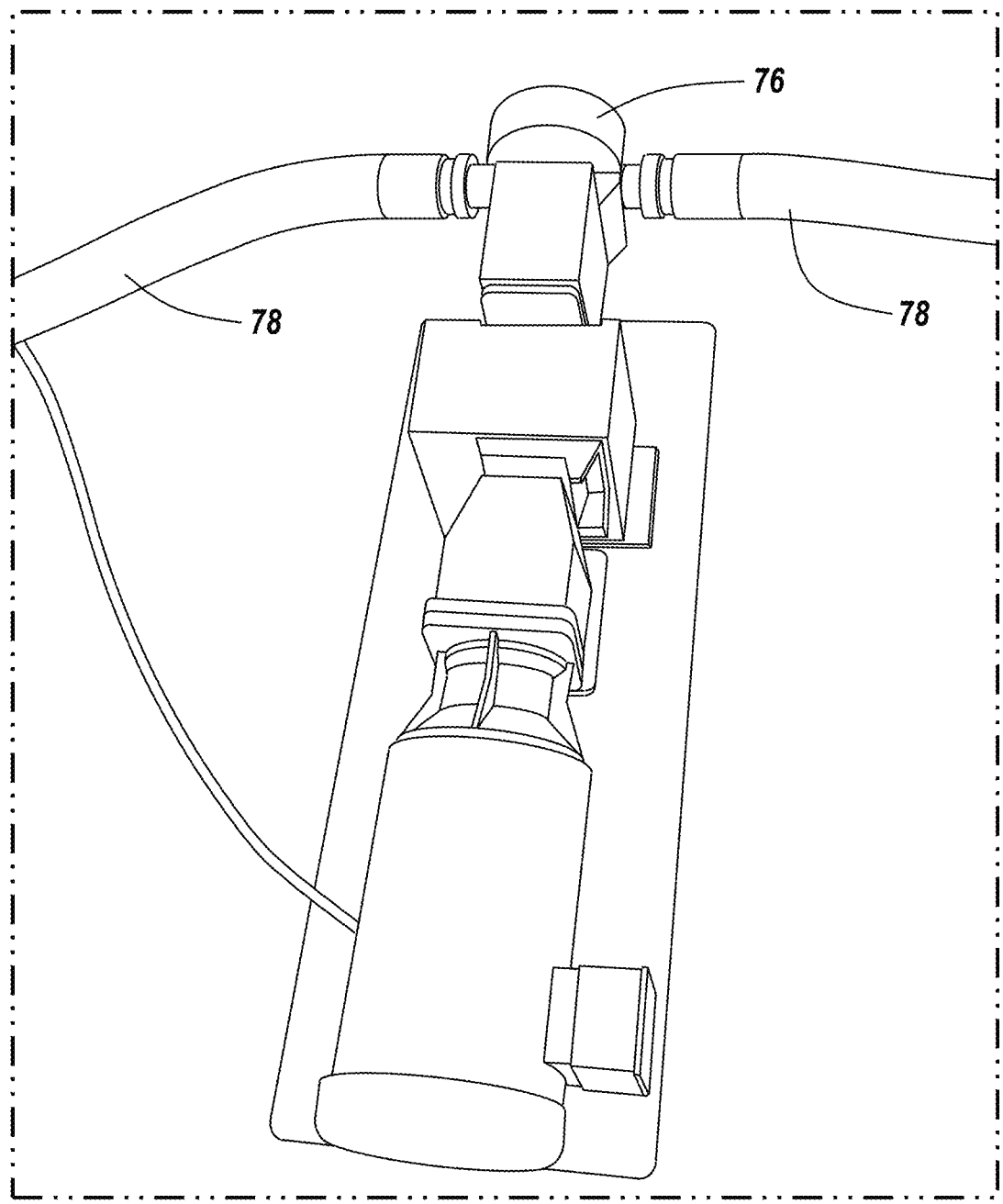
FIG. 4 is a partial view of an exemplary pump system for pumping gel from a source to the manifolds.
Figure 5:
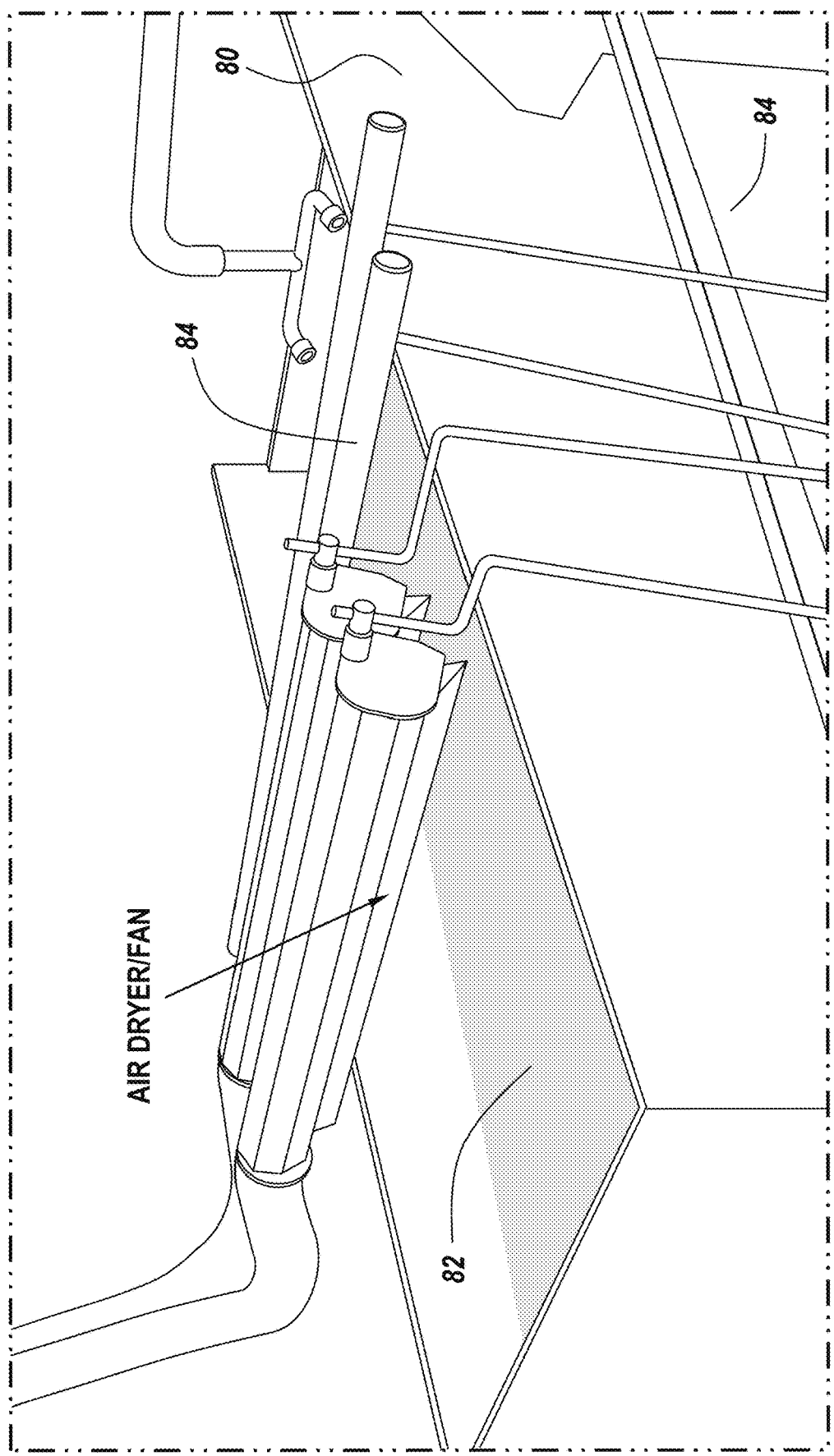
FIG. 5 is a top perspective view of a portion of an exemplary reactant bath platform, according to some embodiments of the present disclosure.

The delivery system 10, shown in FIGS. 1-3, includes a plurality of spray manifolds 12, each manifold 12 having a number of dispensing ports 14.

A pumping system 16 may include a conventional pump, which may be any suitable pump such as a peristaltic pump, positive displacement pump, or a pressurized pumping system.

The pumping system 16 forces the deliverable solution through a first delivery tube 42 to one or more valves 44. The valves 44 may be any suitable valve, for example, a solenoid valve. One or more secondary delivery tubes 46 connects the valve 44 to the manifolds 12. A pressure gauge 47 may be included to measure pressure as the deliverable solution is delivered to the manifold. The pumping system may also include a safety pressure release valve that releases pressure in the event the pressure in the first delivery tube 42 exceeds a preset level.

The bath platform 60, best shown in FIGS. 1 and 2, includes an inclined tray 62, a step or ladder system that includes a number of angled gates or barriers 66 to control the flow, and thereby the time of exposure, of the beads in the bath as they descend the inclined tray, an exit port 68 and a reactant solution recirculation system 72. The manifolds 12 are positioned above an elevated end of the inclined tray 62, such that the gel solution is dispensed into the bath at the elevated end of the tray 62. As the gel drops enter the bath, they immediately take the shape of a bead. However, upon entering the bath, they are still quite soft and not suitable for the end use. The beads require time in the reactant bath to firm. In this particular example, the tray 62 is approximately four feet long and two feet wide having three barriers 66, which leads to a dwell time of the beads in the bath of roughly 5-10 seconds.

Following entry into the bath platform 60, in the illustrated embodiment, the soft beads begin to flow down the tray 62 at a rate dictated by the incline of the tray 62 and the flow of the reactant bath. The gates 66 form a barrier across a majority of the width of the tray 62, with a slight separation or gap G from a sidewall on one end of the tray or a cutout formed in the gate 66. The side of the opening alternates from one gate 66 to the next such that the beads traverse back and forth across the width of the tray as they descend. One having ordinary skill in the art will recognize different tray 62 constructs for passing the beads around or through the gates 66 to force the beads to move from one side of the tray 62 to the other, slowing the descent, and all such constructs are within the scope of the present application. After passing the final gate 66 the reactant bath and the beads fall through the exit port 68 where the beads are captured in a drainage and rinse basin 80 and the reactant solution falls into the recirculation system 72. In another embodiment, the gates 66 may be removed and the length of the tray 62 extended to as to extend the amount of time it takes for the beads to reach the end of the tray 62.

Figure 8:
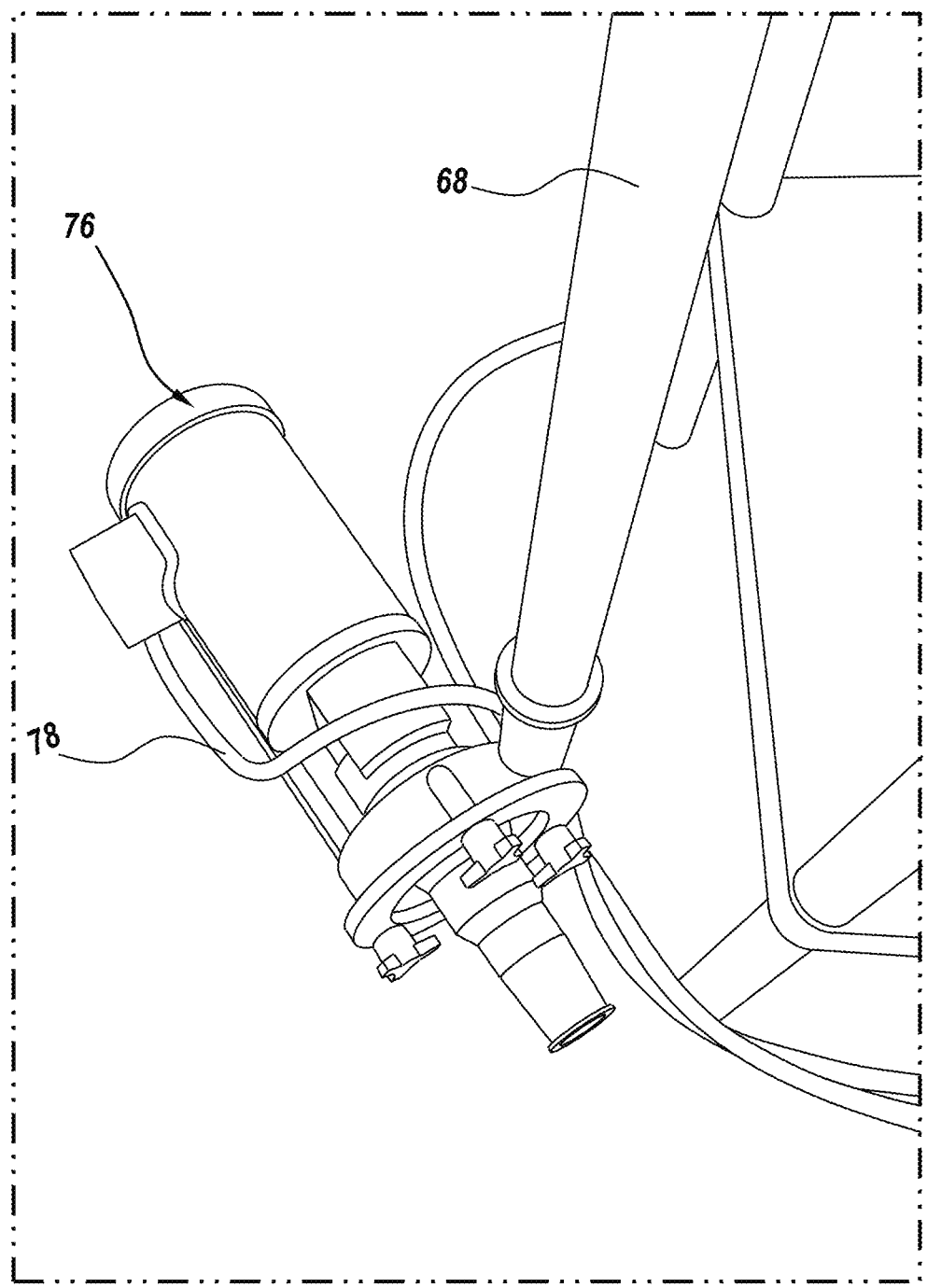
FIG. 8 is a perspective view of a recirculation pump for pumping reactant from the container to the reactant bath platform.

The recirculation system illustrated in FIG. 8 includes a container 74 that captures the solution, the pump 76 to pull the solution out of the container 74 and a piping or tubing 78 that directs the solution from the container 74 to the upper end of the inclined tray 62. As gel drops enter the reactant bath and form beads they absorb the calcium in the reactant bath and as enough calcium has been absorbed from the reactant bath it will need to be rebalanced in order to maintain its effectiveness. Fresh reactant may be pumped into the container 74 every time there is a new batch of gel. After the batch of gel is run, the used reactant may be discarded.

Figure 6:
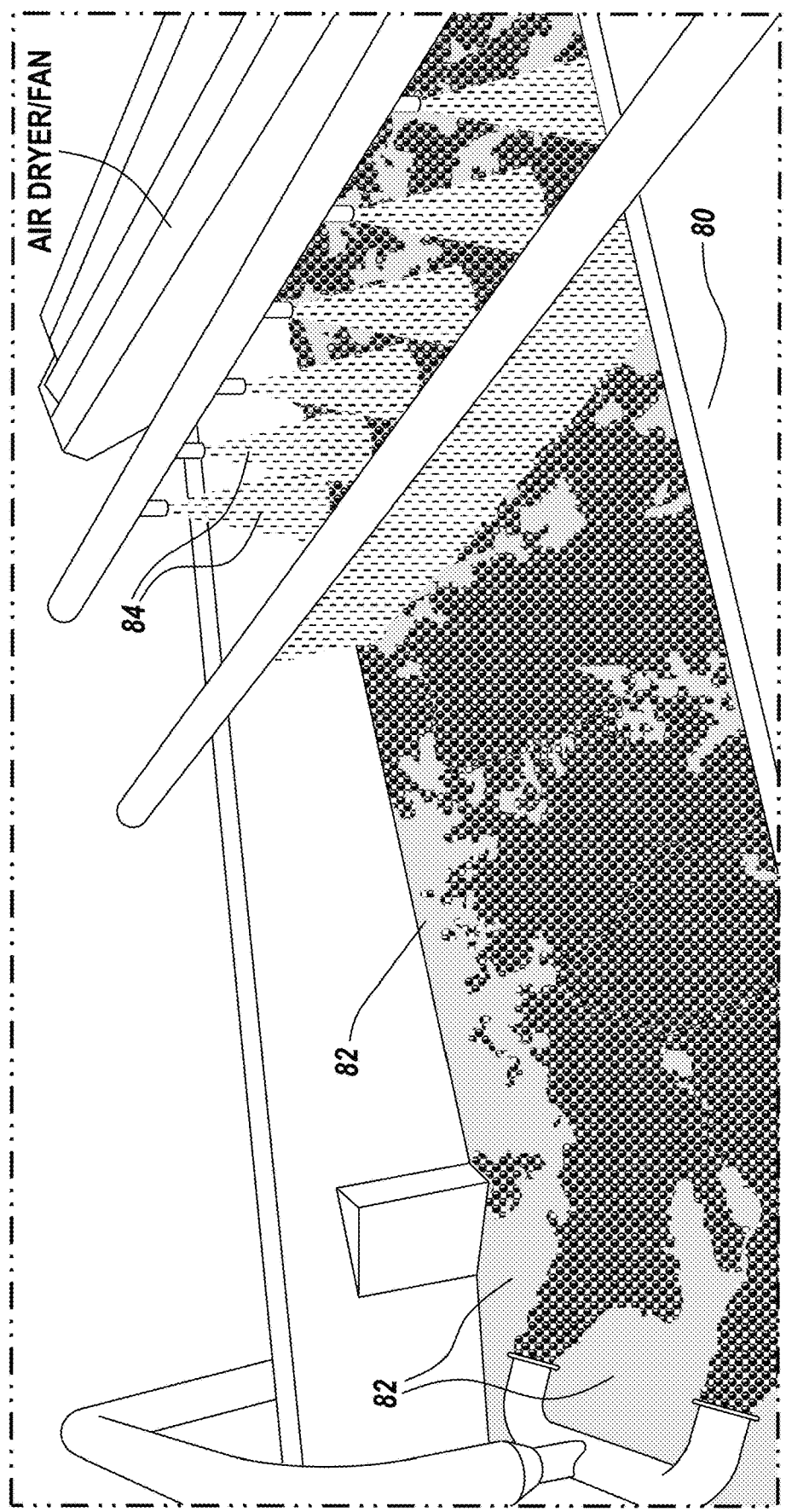
FIG. 6 is a top perspective view of an exemplary rinse platform showing beads being rinsed.
Figure 7:
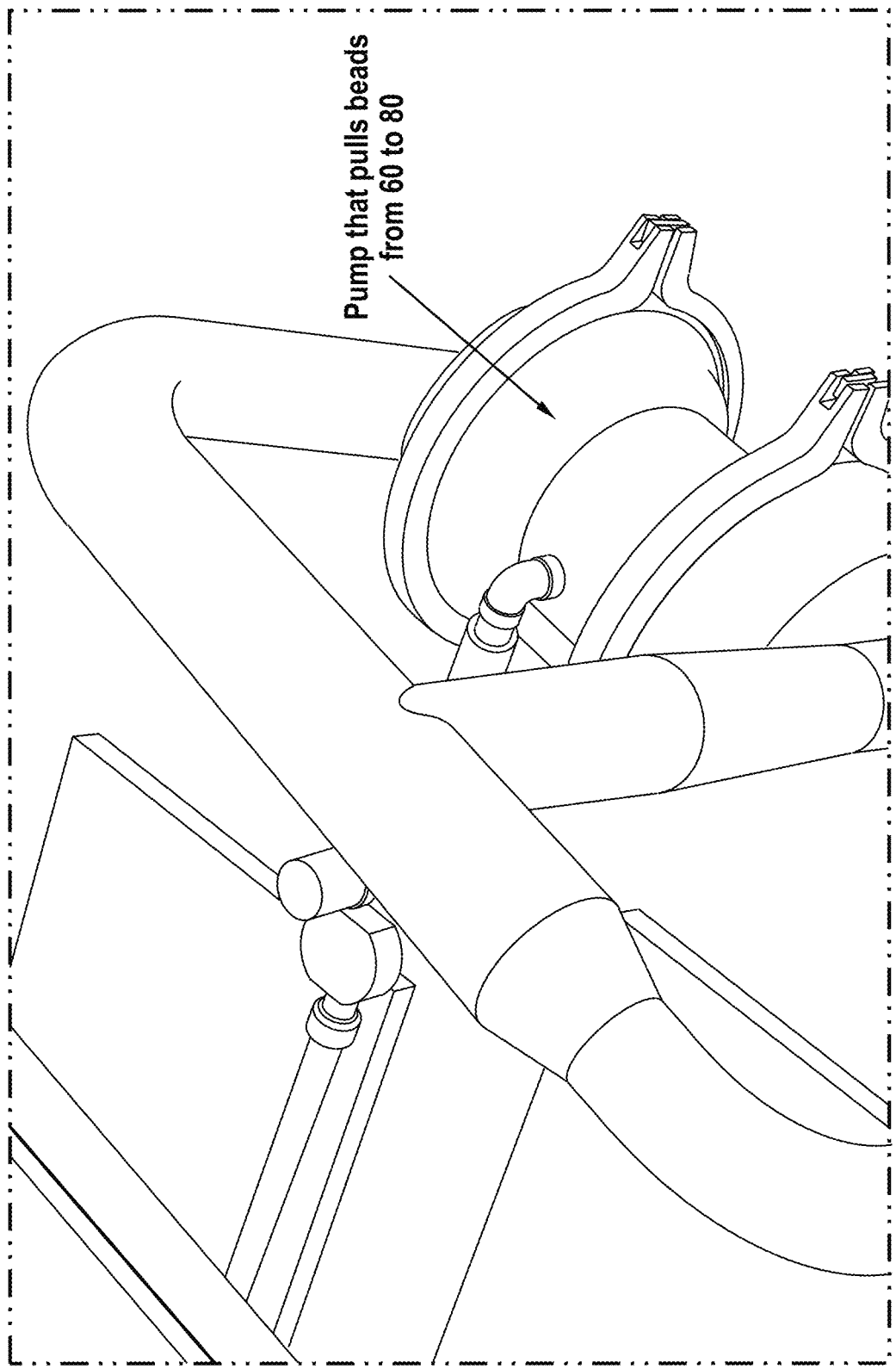
FIG. 7 is a top perspective view of an exemplary pump system for moving beads from the exit port to the rinse platform.

The exit port 68 deposits the beads onto the rinse platform 80. As illustrated in FIG. 7, a pump 90 may be used to draw the beads from the exit port 68 through an intake pipe 92. The pump 90 may push the beads through the outflow pipe 94 to the rinse platform 80. As illustrated in FIG. 6, the rinse platform 80 includes a conventional mesh strainer, sieve, sift, or vibrating screen 82, that collects the semi-firm or firm beads while allowing the reactant solution to drain into the container 74. The beads are sprayed, either manually or with a conventional automated spray apparatus 84. Multiple sprayers or spray applications may be applied to the beads until the beads are properly rinsed and/or coated with oils, salts, preservatives, or the like. One or more air dryers 86 may be used to further dry an exterior of the beads and/or the bead coatings. After passing through the dryer, the beads are ready to be collected. A brine solution, containing a divalent cation such as $Ca^{2+}$, may be added to the beads after they are collected and packaged. The process of transporting the beads from the strainer 82 to the storage collection may be a manual process or it may be automated using conventional technology.

FIGS. 1-8 illustrate an exemplary apparatus (or apparatus components) that may be used to perform the methods disclosed herein and produce the beads as presently described. However, it is to be appreciated that other types of machinery may also or alternatively be used to practice the presently disclosed and claimed subject matter.

Figure 9:
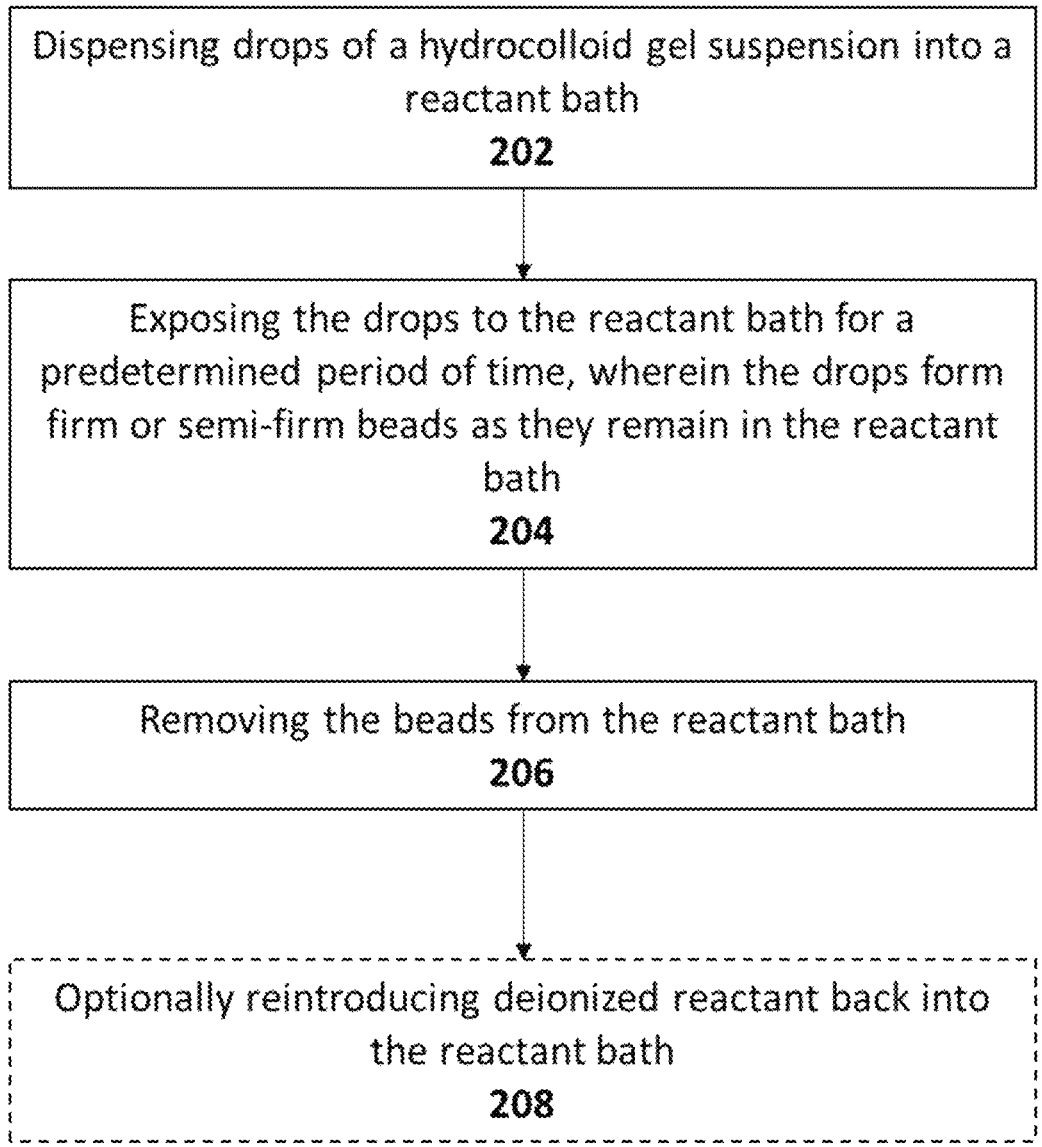
FIG. 9 is an exemplary high-throughput method of producing hydrocolloidal beads, in accordance with some embodiments of the subject disclosure.

FIG. 9 describes an exemplary method of creating hydrocolloid beads in accordance with some embodiments of the present disclosure. As shown in FIG. 9, method 200 includes dispensing drops of a hydrocolloid gel suspension into a reactant bath (Block 202). In select embodiments, dispensing drops of the hydrocolloid gel suspension into the reactant bath may be accomplished using a pressurized line to force the hydrocolloid gel suspension through a plurality of nozzles.

The hydrocolloid gel suspension may contain any desired nutrients and/or additives. For example, in some embodiments, the hydrocolloid gel suspension may contain one or more plant-based and/or animal-based proteins. In select embodiments, the hydrocolloid gel suspension may contain one or more isolate proteins (e.g., wheat protein, soybean protein, pea protein, and/or other plant-based protein). The hydrocolloid gel suspension may have a viscosity within the range of 2,000 and 20,000 centipoise (e.g., 4,000-15,000 centipoise, or 5,000-10,000 centipoise) at room temperature.

Method 200 also includes exposing the drops to the reactant bath for a predetermined period of time, wherein the drops form firm or semi-firm beads as they remain in the reactant bath (Block 204). In some embodiments, the predetermined period of time the drops are exposed to the reactant bath is between one (1) minute and ten (10) minutes. In select embodiments, the drops may be exposed to the reactant bath for between two (2) and (8) minutes, or, in some cases, approximately five (5) minutes. The reactant bath may contain calcium ions (Ca2+), potassium ions (K+), and/or magnesium ions (Mg2+). The reactant bath may be kept at room temperature or above room temperature, as desired. If the reactant bath is kept at or rear room temperature, probiotics may be included in the hydrocolloid gel suspension and in the resulting beads. In some cases, the reactant bath has a temperature within a range of 60 and 180 degrees Fahrenheit. In select embodiments, the reactant bath may have a temperature within a range of 60 to 90 degrees Fahrenheit.

Method 200 further includes removing the beads from the reactant bath (Block 206). In some cases, removing the beads from the reactant bath is accomplished by separating the beads from deionized reactant, for example, using a vibrating and rotating drum. If desired, gravity and a mesh screen may be used to collect and dry the beads.

Method 200 also optionally includes, in some embodiments, reintroducing deionized reactant back into the reactant bath (Block 208). If deionized reactant is reintroduced, additional ions can be added to the reactant and/or the reactant bath to ensure a sufficient quantity of ions is available to aid in gel formation. Method 200 may be carried out, in some embodiments, at a temperature within the range of 60 to 165 degrees Fahrenheit. In select embodiments, method 200 may be carried out at a temperature within the range of 60 to 90 degrees Fahrenheit.

The beads formed by method 200 may have numerous desirable qualities. For example, the beads may have a substantially uniform cross-section with no discernable outer skin. The beads may also have a squishy (sponge-like) texture and be resistant to syneresis. The beads may have any desired size, such as between 1 mm and 5 mm, in some embodiments. The beads may have a viscosity of between 2,000 and 10,000 centipoise, such as between 4,000 and 8,000 centipoise, or approximately 5,000 centipoise, in some embodiments. The beads may have a pH of between 3.0 and 6.0, such as between 3.5 and 5.5, in some cases.

The beads may contain any desired amounts and ratios of nutrients. For example, in some embodiments, the beads may contain at least 1% protein and between 70% and 95% water. In some embodiments, the beads may contain between 2% and 10% protein and 80% to 95% water. The beads may contain a colorant, if desired.

It is understood that the embodiments described herein are merely illustrative of the present disclosure. Variations in the process and/or the construction of the device may be contemplated by one skilled in the art without limiting the intended scope of the inventive subject matter herein disclosed and as defined by the following claims.

What is claimed is:

1. A method of creating hydrocolloid beads, the method comprising:
   forcing a hydrocolloid gel suspension through a plurality of nozzles, wherefrom the hydrocolloid gel forms into a plurality of gel drops and fall into a reactant bath;
   exposing the drops to the reactant bath for a predetermined period of time, wherein the drops form beads as they remain in the reactant bath;
   removing the beads from the reactant bath;
   rinsing the beads;
   drying the beads; and
   pasteurizing the beads at a temperature of at least 250° F.

2. The method of claim 1, wherein the hydrocolloid gel suspension has a viscosity within a range of 2,000 and 20,000 centipoise at room temperature.

3. The method of claim 1, wherein the reactant bath contains calcium ions (Ca2+), potassium ions (K+), and/or magnesium ions (Mg2+).

4. The method of claim 1, wherein the reactant bath has a temperature within a range of 60 and 180 degrees Fahrenheit.

5. The method of claim 1, wherein removing the beads from the reactant bath comprises separating the beads from a deionized reactant.

6. The method of claim 5, wherein the beads are separated from the deionized reactant with a vibrating screen.

7. The method of claim 5, further comprising introducing the deionized reactant to the reactant bath.

8. The method of claim 7, further comprising adding ions to the deionized reactant and/or the reactant bath.

9. The method of claim 1, wherein the predetermined period of time is between 1 minute and 10 minutes.

10. The method of claim 1, wherein the bath is maintained at a temperature within the range of 60 to 165 degrees Fahrenheit.

11. The method of claim 1, wherein the beads have a pH within a range of 3.0 to 6.0.

12. The method of claim 1, wherein the beads have a size of between 1 mm and 5 mm.

13. The method of claim 1, wherein the beads have a viscosity of between 2,000 and 10,000 centipoise.

14. The method of claim 1, wherein the beads contain 0-10% protein and between 70% and 98% water.

* * * * *